Bennett P. Spear.
Improvement in Operating Water-Closet Cocks.
No. 119,058.          Patented Sep. 19, 1871.

WITNESSES.
F. H. Smith
J. Ward

INVENTOR
B. P. Spear,
by Carroll D. Wright & E. Snow
Attys.

UNITED STATES PATENT OFFICE.

BENNETT P. SPEAR, OF CHARLESTOWN, MASSACHUSETTS.

IMPROVEMENT IN OPERATING WATER-CLOSET COCKS.

Specification forming part of Letters Patent No. 119,058, dated September 19, 1871.

*To all whom it may concern:*

Figure 1:
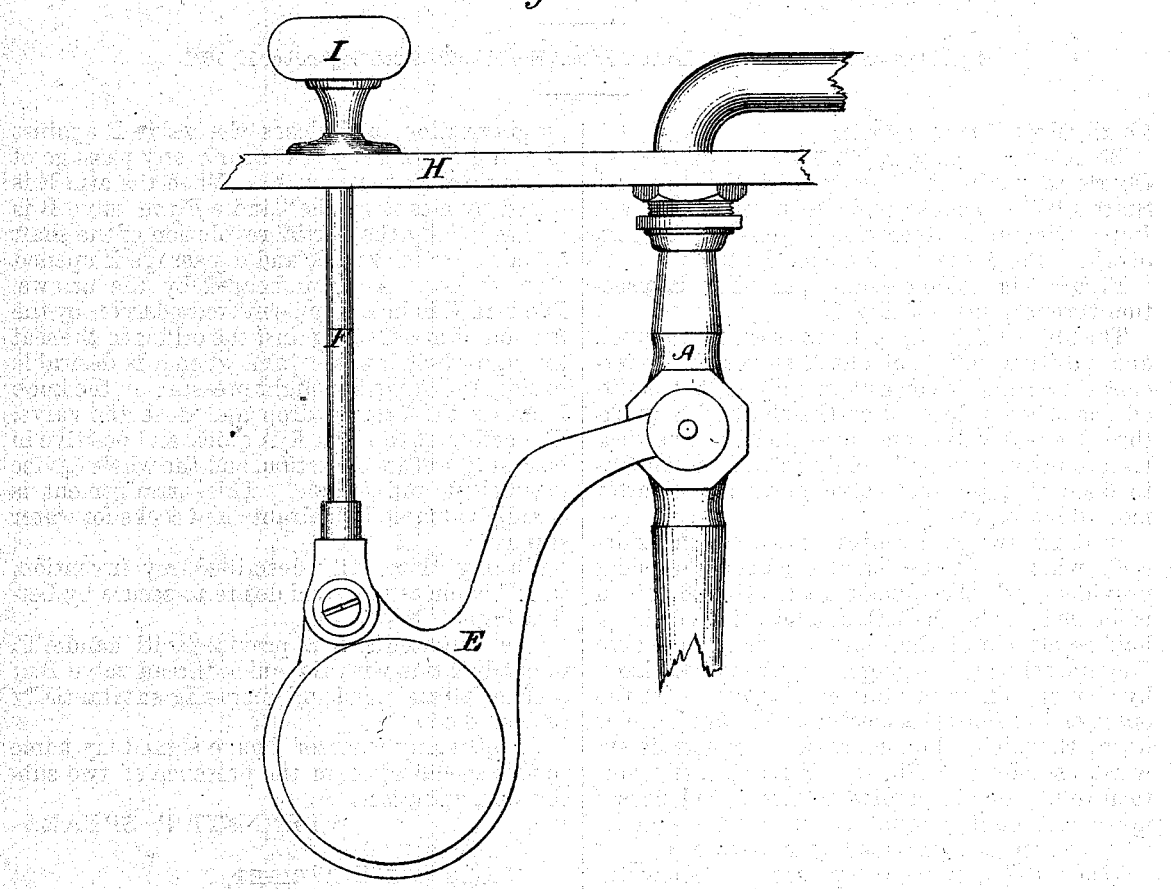
Figure 2:
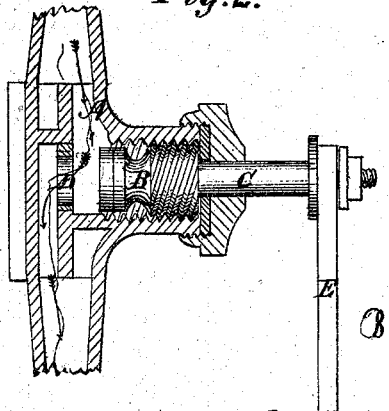

Be it known that I, BENNETT P. SPEAR, of Charlestown, in the county of Middlesex and State of Massachusetts, have invented certain Improvements in Operating Water-Closet Cock, of which the following is a specification:

Figure 1 is a side elevation, and Fig. 2, a section through line $x\ x$, Fig. 1.

The object of this invention is to secure a quick and positive action of check-valves for water-closet use; and it consists, mainly, of a weighted arm or lever located on the shaft of a quick-thread check-valve, and operated by a vertical handle pivoted to said weight in such manner as to open or close said valve, as will hereinafter more fully appear.

In the drawing, A represents the compression-cock, which is of the usual construction, being provided with the quick-thread valve B, which is located on the shaft C, and adjusted so that a half revolution of the same will close the valve B against the packed ring D, or vice versa, thereby shutting off or turning on the valve. On the outer end of shaft C is located a weighted arm or lever, E, which, when depressed, projects downward, as shown in Fig. 1. F represents a vertical rod, which is pivoted to arm E and passes upward through a suitable orifice in the seat H, above which it is provided with a knob, I.

When the arm E is depressed, as shown in Fig. 1, it is in the position it naturally assumes by gravitation, and closes the valve B against the ring D, thereby preventing any passage of water through the cock A. When the arm E is raised by means of the handle F the valve B is withdrawn by the partial revolution of the shaft C, as shown in Fig. 2, and a passage is opened through cock A, as indicated by the arrows. The arm E is held in an elevated position by the friction of handle F against the orifice in the seat through which it passes, and when it is desirable to close the valve B a slight pressure on the knob I causes the arm to drop and close the valve. The action of the arm E is quick and positive in both stages of its operation, and the whole device is efficient and simple. This arrangement is equally valuable in hydrants and cocks for water supply.

Having thus fully described my invention, what I claim as new, and desire to secure by Letters Patent, is—

The weighted arm E, provided with handle F, in combination with the quick-thread valve B of cock A, all arranged and operating substantially as described.

In testimony whereof I have signed my name to this specification in the presence of two subscribing witnesses.

BENNETT P. SPEAR.

Witnesses:
CARROLL D. WRIGHT,
C. F. BROWN.

(8.)